United States Patent

[11] 3,596,080

| [72] | Inventor | Ronald Albert Hayward<br>Solihull, England |
|---|---|---|
| [21] | Appl. No. | 866,252 |
| [22] | Filed | Oct. 14, 1969 |
| [45] | Patented | July 27, 1971 |
| [73] | Assignee | Joseph Lucas Industries Limited<br>Birmingham, England |

[54] COMBINED LAMP AND REFLECTOR UNITS
1 Claim, 1 Drawing Fig.

[52] U.S. Cl. ................................................. 240/7.1
[51] Int. Cl. ................................................... B60q 1/00
[50] Field of Search .......................................... 240/7.1 B,
7.1 C, 7.1 E, 7.1 F, 7.1 G, 8.1; 340/98; 240/7.55,
8.41

[56] References Cited
UNITED STATES PATENTS
1,411,888  4/1922  Myers ........................ 340/98 UX

*Primary Examiner*—Donald O. Woodiel
*Attorney*—Holman & Stern

ABSTRACT: A combined lamp and reflector unit for use on a road vehicle has a resilient member with a base of generally rectangular form and an integral peripheral flange upstanding from the base. The second integral flange upstanding from the base and defines with the first flange a groove extending around the periphery of the base, and there is also a crosspiece integral with the resilient part and defining with the base and the second flange first and second rectangular compartments. In the first compartment is a bulb-supporting unit which extends through the base, and in the first compartment is a lens which is held in position by part of the second flange and the crosspiece. A backing plate is positioned within the second compartment, as is a reflector which is held in position by the remainder of the second flange and the crosspiece. Finally, a decorative bezel is trapped in the groove and obscures the second flange.

PATENTED JUL 27 1971
3,596,080
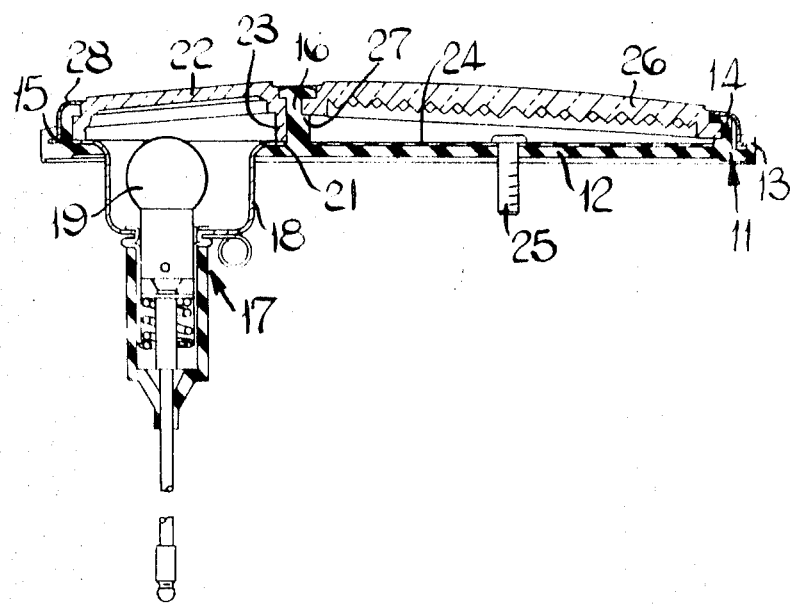
INVENTOR
Ronald Albert Hayward
BY Holman, Glascock
Downing & Seebold
ATTORNEYS

COMBINED LAMP AND REFLECTOR UNITS

This invention relates to a combined lamp and reflector unit for use on a road vehicle.

A unit according to the invention includes a resilient member having a base of generally rectangular form, an integral peripheral flange upstanding from said base, a second integral flange upstanding from said base and defining with the first flange a groove extending around the periphery of the base, a crosspiece integral with said resilient part and defining with the base and the second flange first and second rectangular compartments, a bulb-supporting unit housed within the first compartment and extending through the base, a lens within the first compartment, the lens being held in position by part of the second flange and the crosspiece, a backing plate within the second compartment, a reflector within the second compartment, the reflector being held in position by the remainder of the second flange and the crosspiece, and a decorative bezel trapped in said groove, the bezel obscuring the second flange.

In the accompanying drawing, the figure is a sectional side view illustrating one example of the invention.

Referring to FIG. 1, the unit includes a rubber part 11 which incorporates a base 12 of rectangular configuration, a peripheral flange 13 extending around the base, and a second flange 14 extending parallel to the flange 13 and defining therewith a groove 15. The part 11 further includes a crosspiece 16 which together with the flange 14 and base 12 defines a pair of rectangular compartments.

Within the smaller of the rectangular compartments is a bulb-support 17 which extends rearwardly through a hole in the base 12. The bulb-support includes a housing 18 for the bulb 19, the housing 18 having a peripheral flange 21 which rests on the base 12, with a pair of bolts (not shown) fixed to the flange 21 extending through holes in the base 12. Also in the first compartment is a lens 22 which is trapped in position by virtue of engagement between portions 23 of the lens 22 within grooves defined by the crosspiece 16 and the flange 14. It will be noted that the lens 22 is shaped so that it is inclined relative to the base 12, assuming the base 12 is flat.

Within the other rectangular compartment is a backing plate 24 having fixed thereto a bolt 25 extending through a hole in the base 12. Also within the second compartment is a reflector 26 which is inclined relative to the base 12 in the opposite direction from the lens 22. The inclination of the lens 26 is achieved by providing a shoulder 27 on the crosspiece 16, this shoulder being further from the base 12 than the groove in the flange 14 with which the other side of the reflector 26 is engaged.

The unit further includes a decorative bezel 28 which is engaged within the groove 15. The bezel 28 has a crosspiece corresponding with the crosspiece 16, and so obscures the crosspiece 16 and flange 14 so that the unit presents a neat appearance.

Having thus described my invention what I claim as new and desire to secure by Letters Patent is:

1. A combined lamp and reflector unit for use on a road vehicle including, a resilient member having a base of generally rectangular form, an integral peripheral flange upstanding from said base, a second integral flange upstanding from said base and defining with the first flange a groove extending around the periphery of the base, a crosspiece integral with said resilient part and defining with the base and the second flange first and second rectangular compartments, a bulb-supporting unit housed within the first compartment and extending through the base, a lens within the first compartment, the lens being held in position by part of the second flange and the crosspiece, a backing plate within the second compartment, a reflector within the second compartment, the reflector being held in position by the remainder of the second flange and the crosspiece, and a decorative bezel trapped in said groove, the bezel obscuring the second flange.